United States Patent [19]
Goldowsky

[11] 4,379,598
[45] Apr. 12, 1983

[54] MAGNETIC BEARING

[75] Inventor: Michael P. Goldowsky, Valhalla, N.Y.

[73] Assignee: North American Philips Corporation, New York, N.Y.

[21] Appl. No.: 219,058

[22] Filed: Dec. 22, 1980

[51] Int. Cl.³ .............................................. F16C 39/06
[52] U.S. Cl. ..................................................... 308/10
[58] Field of Search ............................ 308/10; 74/5.46

[56] References Cited

U.S. PATENT DOCUMENTS

| | | | |
|---|---|---|---|
| 3,243,238 | 3/1966 | Lyman | 308/10 |
| 3,378,315 | 4/1968 | Webb | 308/10 |
| 3,428,371 | 2/1969 | Lyman | 308/10 |
| 3,614,181 | 10/1971 | Meeks | 308/10 |
| 3,741,613 | 6/1973 | Pfaler | 308/10 |
| 3,958,842 | 5/1976 | Telle | 308/10 |
| 4,285,248 | 8/1981 | Noar | 74/5.46 |
| 4,320,927 | 3/1982 | Sertich | 308/10 |

FOREIGN PATENT DOCUMENTS

| | | | |
|---|---|---|---|
| 2421853 | 11/1975 | Fed. Rep. of Germany | 308/10 |
| 2367939 | 6/1978 | France | 308/10 |

*Primary Examiner*—R. Skudy
*Attorney, Agent, or Firm*—David R. Treacy

[57] ABSTRACT

A bearing has an inner ring of magnetic material having an annular recess in its outer periphery for receiving a first annular permanent magnet ring, and an outer ring having an annular recess in its inner surface for receiving a second permanent magnet ring. The magnet rings are spaced to provide a gap therebetween. The permanent magnet rings are poled in the radial direction, with like poles facing one another. The magnet rings may have inclined surfaces, with greater diameters at one end than at the other, for axial loading, or they may extend straight in the axial direction. The magnet rings may be built up of segment shaped pieces, which may be stacked also in the radial direction.

15 Claims, 13 Drawing Figures

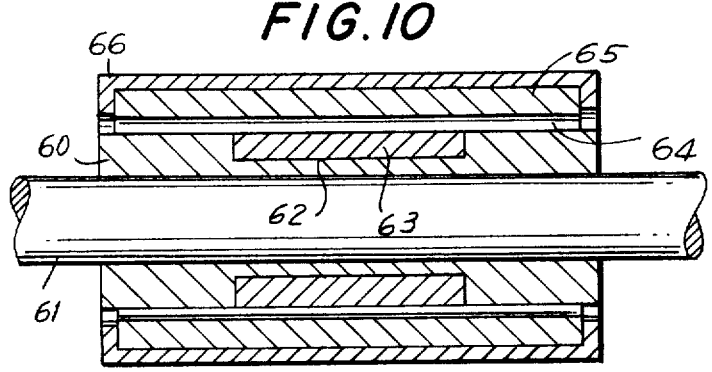
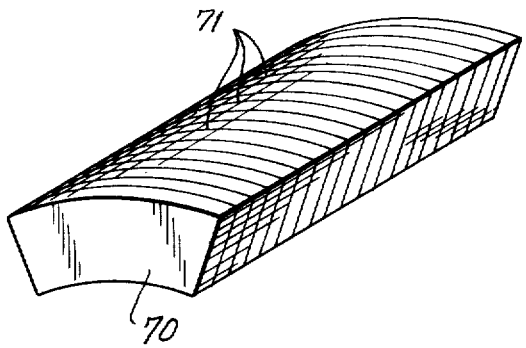
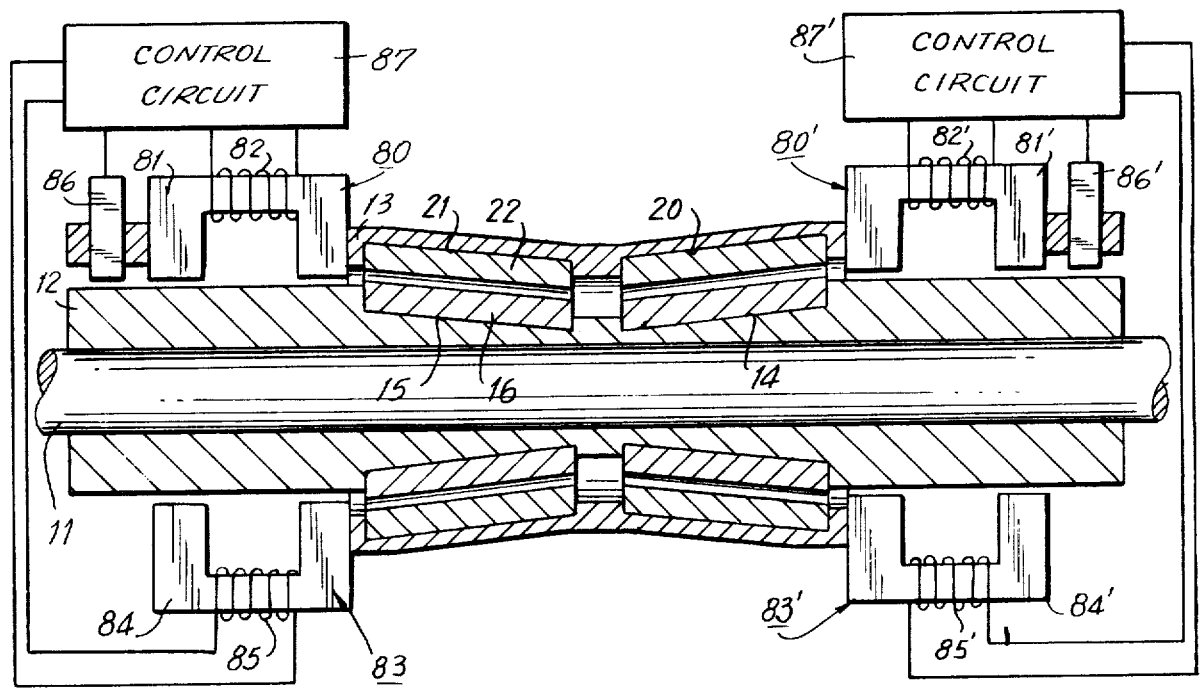

MAGNETIC BEARING

BACKGROUND OF THE INVENTION

This invention relates to bearings, and is more particularly directed to a bearing employing magnetic forces between inner and outer rings.

The use of magnetic action is disclosed, for example, in U.S. Pat. No. 4,057,369, wherein the inner ring of the bearing is comprised of a soft magnetic material, and the outer ring is formed of a plurality of electromagnetic poles. While such bearings have great advantages, for example, in the reduction of losses, they do result in the consumption of electric power.

SUMMARY OF THE INVENTION

The present invention is therefore directed to a magnetic bearing structure, wherein permanent magnets are employed in order to even further minimize the loss in the bearing. The use of permanent magnets also facilitates the provision of a bearing suitable for cryogenic purposes, thus, reducing the cost of bearings for this purpose.

Briefly stated, in accordance with the invention, a magnetic bearing is comprised of an inner ring, and an annular magnetic ring on the outer surface of the inner ring. An outer ring is spaced from the inner ring, and has a second permanent magnet ring on its inner surface, the two magnet rings being spaced to form a gap therebetween. The inner and outer rings are of a magnetic material, to provide a flux return path, and the magnet rings are permanent magnets poled perpendicular to the gap, with like poles facing one another.

In a particularly advantageous embodiment of the invention, each of the magnets may be formed as a pair of rings at opposite axial ends of the respective bearing rings, the pairs of magnet rings being inclined to have larger diameters at one end than the other. In this way the bearing in accordance with the invention may be formed to resist axial forces.

In a further embodiment of the invention, in order to be able to employ particularly advantageous magnetic materials, the permanent magnet rings may be formed of discrete segments of the magnetic material. Further, each of the segments may be formed of a plurality of layers radially stacked one on the other.

In a particularly advantageous arrangement in accordance with the invention, dynamic compensation is provided in the bearing, in order to reduce any tendency for instability in the bearing. While such compensation may require the use of a certain amount of external power, since the power required is for compensation only, it is considerably less than that required in an active magnetic bearing structure.

DESCRIPTION OF THE DRAWINGS

In order that the invention will be more clearly understood, it will now be disclosed in greater detail with reference to the accompanying drawings, wherein:

FIG. 10 is a longitudinal cross-sectional view of a further modification of the bearing in accordance with the invention;

FIG. 11 is a perspective view of a further modification of a permanent magnet ring segment in accordance with the invention;

FIG. 12 is a longitudinal cross-section of a bearing in accordance with a further embodiment of the invention, employing dynamic compensation.

DESCRIPTION OF THE PREFERRED EMBODIMENT

Figure 1:
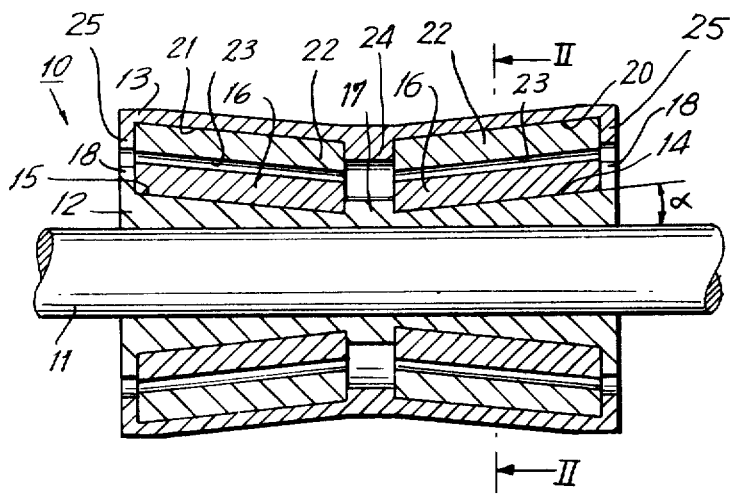
FIG. 1 is a longitudinal cross-section of a bearing in accordance with one embodiment of the invention.
Figure 2:
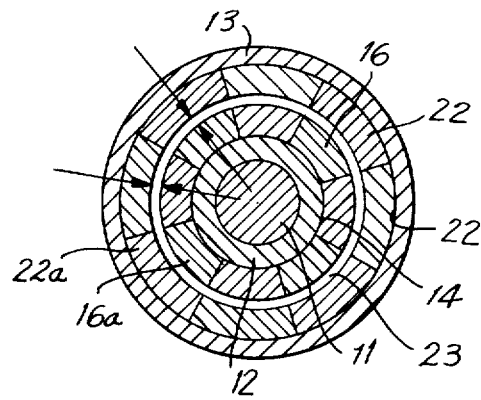
FIG. 2 is a cross-sectional view of the bearing of FIG. 1 taken along the lines from II to II.

Referring now to the drawings, and more in particular to FIGS. 1 and 2, therein is illustrated a bearing 10 mounted on a shaft 11. The bearing 10 has an inner ring 12, which may be affixed to the shaft, and an outer ring 13 rotatable with respect to the inner ring. In the embodiment of the invention illustrated in FIGS. 1 and 2, the outer surface 14 of the inner ring to one side of the axial center is inclined, to have increasing diameters toward the respective axial end of the ring. Similarly, the outer surface 15 of the inner ring on the other axial end is inclined to have greater diameters toward the respective end of the ring. Annular magnets 16 are provided on the surfaces 14 and 15. If desired, the surfaces 14 and 15 may be cup-shaped, to hold the magnets axially. For this purpose, the ring 12 may have a central annular outwardly projecting ridge 17, and outwardly extending flanges 18 engaging the ends of the magnets structures.

Figure 3:
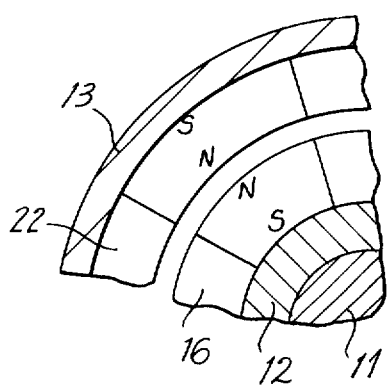
FIG. 3 is an enlarged view of a portion of the cross-section of FIG. 2, showing the configuration of the magnets in somewhat greater detail.

Similarly, the inner surface 20 of the outer ring 13, on the axial end thereof opposed to the surface 14, is inclined to have expanding diameters toward the respective axial end thereof, and the inner surface 21 of the outer ring facing the surface 15 is inclined to have greater diameters towards the respective axial end of the ring 13. Annular magnets 22 are provided on these radially inwardly directed surfaces, the magnets 22 being spaced from the magnets 16 to form a gap 23 therebetween. As in the case of the inner ring, the outer ring may be formed to have cups for holding the magnets in position, for example, by providing a central radially inward directed annular ridge 24 and radially inward directed flanges 25. In accordance with the invention, the rings 12 and 13 are of magnetic material, such as iron, and the magnets 16 and 22 are permanent magnets with their poles being directed radially. In other words, the opposite poles of each magnet are on the opposite radial surfaces thereof. Further, as shown in FIG. 3, the magnets are poled with like poles toward one another. For example, the north pole of the outer magnet ring 22 may be directed radially inwardly, in which case the north pole of the inner magnet 16 is directed radially outwardly. The inclinations of the surfaces of the rings, with respect to the axis of the shaft, are selected in accordance with the use to which the bearing is to be put. This will be discussed in greater detail in the following paragraph.

While the magnetic bearing in accordance with the invention is particularly useful for cryogenic application, for example, for the rhombic-drive of a cryogenic cooler, since it does not require contaminating materials such as a lubricant, and since it has a long life as the result of no wear, it is apparent that the bearing of the invention may be employed for other applications. The arrangement of the invention, illustrated in FIGS. 1 and 2, is capable of sustaining both radial and axial loads. Thus, due to the repulsion forces of the magnets, if the inner ring and shaft move radially closer to the outer ring at one location, and the application of a load, a repulsive restoring force causes the shaft to move back towards its center of equilibrium position.

On the other hand, if there is an axial displacement of the inner ring and shaft in one direction, due to the angle of inclination, one of the gaps, i.e., to one side of the axial center, increases, thereby reducing its push on the shaft at this side. The gap on the other side, however decreases, thereby increasing the shaft force in the opposite direction. The net force is therefore in the direction which will restore the shaft and inner ring to its original central position, thereby supporting an axial load.

Figure 4:
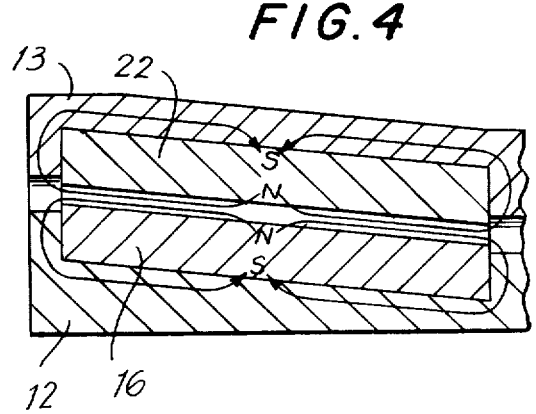
FIG. 4 is an enlarged view of a portion of the cross-section of FIG. 1, showing the magnetic path in the bearing.

The magnetic inner and outer rings 12 and 13 respectively serve as iron flux return paths, to reduce magnetic field length and make an efficient bearing. These rings, or "cups" provide a low reluctance path for the flux to extend between the poles. The flux paths are illustrated in FIG. 4, wherein it is seen that they extend generally parallel to the lengthwise direction in the gap, thence enter the respective rings and extend generally parallel again in the longitudinal direction of the gap, to the opposite pole. The cups may consequently be designed to provide a range of force/deflection characteristics, i.e., linear or non-linear characteristics over a given range. As a consequence, it is possible to adjust the characteristics of the bearing to provide, for example, a stiffer bearing, i.e., having a greater spring rate.

The size of the angle $\alpha$ determines the axial load capacity of the bearing. When $\alpha$ is small, for example 15°, a small axial load compared to the radial capacity is provided. This is ideal for the above-noted rhombic-drive bearings for cryogenic coolers. In such a rhombic drive, the yoke bearings, link bearings and main bearings only support a radial load. Therefore, the inclination may be relatively small to merely stabilize the bearing in the axial direction and provide sufficient thrust capacity, thereby to avoid metal-to-metal contact under all operating conditions. It is of course apparent that other angles may be employed. For example, if the angle $\alpha$ is 45°, the bearing may have equal radial and axial load bearing capacities.

Figure 5:
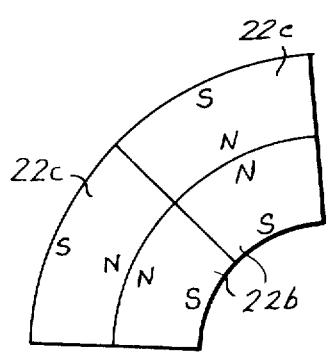
FIG. 5 is a simplified end view of a modification of a magnet ring segment in accordance with the invention.
Figure 6:
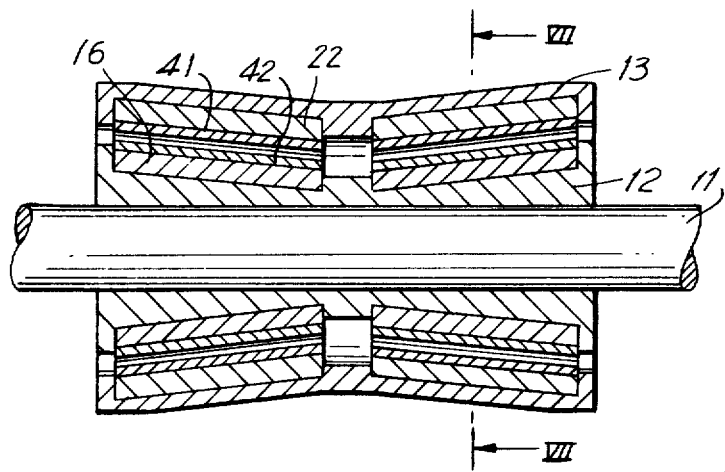
FIG. 6 is a longitudinal cross-sectional view of a modification of the bearing in accordance with the invention.
Figure 7:
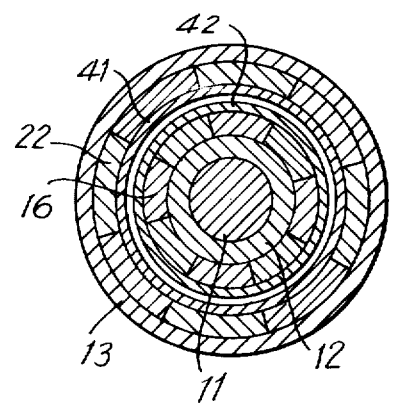
FIG. 7 is a transverse cross-sectional view of the bearing of FIG. 6 taken along the lines of VII—VII.

With some advantageous permanent magnetic materials, it is not possible to radially magnetize the solid material. For example, samarium cobalt has extremely desirable magnetic properties, but cannot always be magnetized radially. For this purpose, and, as illustrated in FIG. 2, the annular magnets 16 and 22 are formed of angularly distributed radially and axially extending segments 16a and 22a respectively. While only eight segments are shown for each of these magnets, it is apparent that any desired number may be employed. Further, as illustrated in FIG. 5, each of the magnets, such as the outer magnet as illustrated, may also be formed of radially stacked segment portions 22b and 22c, in order to facilitate the application of the bearing. The magnets are hence built up as "pie slices", to form concentric rings of about equal magnet volume, thereby to provide the desired radially repulsive force.

The force factors acting on the bearing are illustrated by the arrows of FIG. 2. From this drawing it is apparent that relative rotation between the inner and outer magnets will not be smooth, since the inner magnets will rotate and force themselves into alignment between the force vectors of the outer magnets. This produces a detenting action like a magnetic coupling. Upon forced rotation, a push-pull effect occurs in the bearing, at a frequency equal to the rotation speed times the number of poles, i.e., segments, in the bearings. While this effect does not consume power, it may result in vibration in a rotating bearing.

In order to reduce vibration due to this detenting action, thin iron sleeves 41 and 42 may be provided on the inner surface of the outer magnets 22 and on the outer surface of the inner magnets 16. The low reluctance path of the soft iron sleeves will "smooth out" the discrete field of each magnet, thereby making a more circumferentially symmetric field free of detent action.

Figure 8:
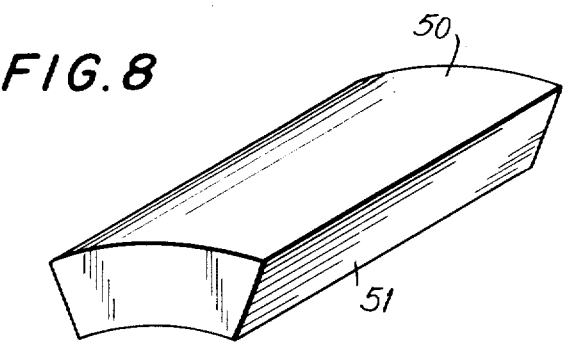
FIG. 8 is a perspective view of a segment of the magnetic ring in accordance with one embodiment of the invention.
Figure 9:
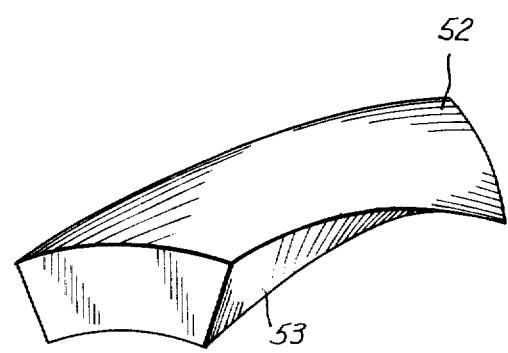
FIG. 9 is a perspective view of a modification of the permanent magnet segment in accordance with the invention.

A typical segment 50 for use of the embodiment of the invention of FIGS. 1-5 is illustrated in FIG. 8, wherein the edges 51 extend in axial planes of the bearing. In a further arrangement for reducing the detenting action, as shown in FIG. 9, the magnet segments 52 may have edges 53 that are skewed with respect to the axial planes of the bearing. This is similar to the technique employed to reduce cogging of electric motor armatures by slotting them at an angle to the axis.

The magnetic bearing of the invention is also suitable for linear moving bearings, such as illustrated in FIG. 10. In this arrangement, the inner ring 60 of the bearing, affixed to shaft 61, forms a cup with an axially extending bottom 62 for holding the inner magnet ring 63. The gap 64 between the magnet 63 and the outer annular magnet 65 also extends directly axially, and the cup formed in the outer ring 66 also extends directly axially, i.e., is not inclined.

The magnetic bearing of FIG. 10 of course operates only in the radial direction, and does not restrain any axial forces. Thus, in the arrangement of FIG. 10, the angle $\alpha$ is zero. The length of the outer magnet ring is preferably longer than that of the inner magnet ring, by at least the length of the required stroke. Consequently, a relatively constant radially centering force exists over the entire stroke length. This type of bearing can be employed, for example, as a piston rod, as well as for displacer rod guides in the rhombic drive of a cryogenic cooler.

The above discussed detenting action of the bearing is not detrimental to the function of a linear bearing, since no rotation occurs. In fact, in some cases the detenting action may be desired, in order to maintain alignment.

The air gap employed in the bearings in accordance with the invention is preferably at least an order of magnitude larger than the air gap for a hydrodynamic bearing of the same capacity. For example, in one bearing in accordance with the invention having a 2.5 inch outside diameter and a length of 2.5 inches, the bearing was designed for a radial clearance of 0.02 inches between the inner and outer magnets. Under a bearing load of 600 pounds, a deflection of 0.01 inch occurs in such a bearing. Such large clearances are tolerant of dirt and contamination and guarantee that the bearing has no metal-to-metal contact.

While eddy current power loss is normally associated with magnetic bearings, it, in most cases, is so low that the bearing design parameters may be optimized independently of this factor. Low losses are a prime advantage of this type of bearing. For example, in a rhombic drive designated for a cryogenic core, wherein the piston peak load was 1300 pounds and the input power was 3,000 watts, the power loss of the bearing in accordance with the invention was calculated to be 150 watts, for an efficiency of 95%.

In order to obtain optimum bearing performance, for example, for such application as gryoscopes, wherein losses must be reduced as much as possible, the magnet segments 70 as shown in FIG. 11, may be separated into lamination segments 71. This effectively shorts out any currents in much the same manner as in transformer lamination.

Permanent magnets, as employed in the invention, are passive, and hence no power is required to energize them, as is not the case of electromagnets. Materials such as samarium cobalt are stable at near cryogenic temperatures, or at slightly elevated temperatures, and hence are readily adaptable for use in accordance with the invention. Although this is an ideal magnet material for the bearing of the invention, since radially thin magnets can be employed, it is also possible to use weaker magnets, for inexpensive applications and lower forces. In this case, for example, ceramic magnets having the required characteristics may be employed advantageously, since such materials may be magnetized radially, thereby avoiding the above-noted segmented construction.

Under some conditions, there may be instability in a bearing employing solely permanent magnets. For this reason, it may be desirable, in accordance with the invention, to dynamically compensate for such unbalance in at least one direction of movement. An example of such dynamic compensation is illustrated in FIG. 12, employing essentially the same permanent magnet bearing structure as illustrated in FIG. 1. It is of course evident that such dynamic compensation may be employed with other embodiments of the invention.

As illustrated in FIG. 12, the inner and outer bearing rings 12 and 13 are extended axially in each direction. An electromagnet 80 having a core 81 and winding 82 is mounted generally in the outer ring 13, adjacent the end of the ring 13 having the surface 21. This electromagnet 80 is spaced radially outwardly of the extension of the inner ring 12 in the corresponding direction, such that it can magnetically influence the inner ring 12. A further electromagnet 83 is mounted in the outer ring 13 diametrically opposite the magnet 80, so that it acts in the same plane as the magnet 80 but on the opposite side of the inner ring. In addition, a sensor 86, such as an eddy current sensor, is mounted on the outer ring in the longitudinal plane of magnetic influence of the magnets 80 and 83, the sensor 86 being spaced from the inner ring 12, so as to be able to provide an output dependent upon the radial distance between the inner and outer rings. The sensor 86, and winding 82 and 85 are connected to a control circuit 87.

A similar arrangement is provided at the other axial end of the bearing, in this case the elements corresponding to the above described dynamic compensation system being identified by primed reference numerals.

It is thus apparent that, in the arrangement of FIG. 12, signals from the sensors 86 and 86' corresponding to relative displacement of the inner and outer rings in the plane of the drawing control their respective electromagnets to provide dynamic compensation in this plane. Similar compensation techniques may be employed in other planes, such as in the plane normal to the plane of the drawing, as well as axially. In addition, if a magnetic shaft is employed, it is apparent that the sensor and the electromagnets may be alternatively arranged to detect the position of and magnetically influence such shaft.

Figure 13:
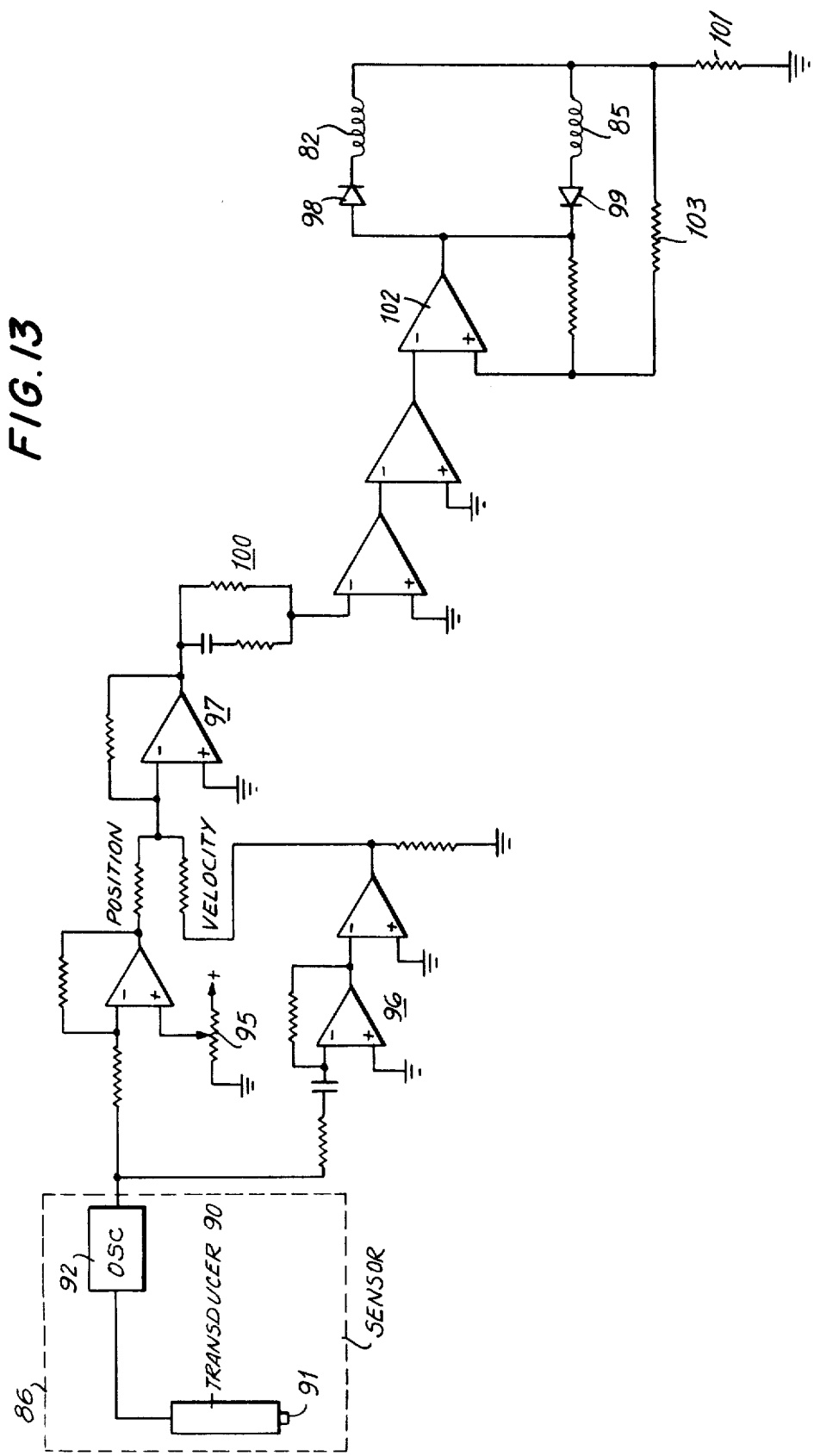
FIG. 13 is a circuit diagram of a dynamic compensation system for the arrangement of FIG. 12.

A control circuit for the dynamic compensation, that may be employed in the system of FIG. 12, is illustrated in FIG. 13. In this arrangement, the sensor 86 illustrated in dashed lines may be an eddy current sensor of conventional construction, for example, a Proximeter Model No. 3000, manufactured by Bently Nevada Corporation. This sensor includes a transducer 90 having a forward tip 91 adapted to be placed adjacent but spaced from the inner ring of the bearing. The sensor further includes a radio frequency coil (not shown) in the forward tip 91 of the transducer. The radio frequency coil is excited by conventional means with a nominal frequency of, for example, 2 MHz, from a circuit module 92. The radio frequency coil in the tip 91 radiates a localized magnetic field pattern which produces eddy currents in the surface layer of the inner ring, thereby loading the radio frequency coil. A resonant circuit in the circuit module 92 changes its output amplitude in response to such loading. Since there may be interference between various transducers in a common system, it may be necessary to provide magnetic shielding (not shown) to minimize such interference.

The sensor output signal is applied to a position comparator circuit 94 for comparison with the potential set by a potentiometer 95. The position comparator circuit 94 thus provides a different output signal between the existing position input as represented by the output of the sensor, and the desired position input as set by the potentiometer 95, this different signal comprising an error signal directly proportional to the displacement of the inner ring of the bearing from its central or axial position within the outer bearing ring.

The output of the sensor is also applied to a differentiator 96. The output of the differentiator 96 is accordingly proportional to the velocity or rate of change of displacement of the inner ring from its desired position. The position and velocity signals are summed in an operational amplifier 97. The gain in the position channel 94 determines the stiffness of the bearing, while the gain in the velocity channel 96 determines the damping of the bearing, these gains being settable by conventional techniques.

The output of the summing amplifier 97 is applied to the electromagnet windings 82 and 85 by way of differently poled diodes 98 and 99 respectively. Since eddy currents in the inner bearing ring and in the core material of the electromagnets cause a phase shift between the current energized in the respective windings and the magnetic flux produced thereby, a phase corrector circuit 100 is provided in the circuit between the amplifier 97 and the windings. A further phase shift caused by inductance of the coils of the electromagnets, which causes the current flowing therein to lag the voltage applied across them, is corrected by a feedback resistor 101, the voltage across the resistor 101 being applied to the non-inverting input of the last amplifier 102 by way of the resistor 103.

While the invention has been disclosed and described as incorporating a separate inner ring, it is apparent that, if desired, the inner ring may form a part of the shaft.

While radial dynamic compensation has been shown, it is apparent that either in addition thereto or alternatively thereto, axial dynamic compensation may be employed. Such axial dynamic compensation can be implemented in the same manner and using the same control configuration as the radial dynamic compensation shown herein. Further, under all values of alpha, from zero to ninety degrees, torsional instability is compensated by the radial control system shown.

Although the invention has been disclosed and described with reference to a limited number of embodiments, it is apparent that variations and modifications may be made therein, and it is therefore intended in the following claims to cover to each such variation and modification as falls within the true spirit and scope of the invention.

What is claimed is:

1. A bearing structure comprising
   an inner cup-shaped ring of magnetic material, having an outer surface and outwardly extending flanges,
   a first permanent magnet ring comprising a plurality of angularly distributed, radially and axially extending segments disposed on said outer surface between said flanges, said ring supporting and restraining said segments and providing a flux return path for said first ring,
   an outer cup-shaped ring of magnetic material, having an inner surface and inwardly extending flanges, and
   a second permanent magnet ring comprising a plurality of angularly distributed, radially and axially extending segments disposed on said inner surface between said inwardly extending flanges, said outer ring supporting and restraining the segments of said second ring and providing a flux return path therefor,
   said first and second rings being spaced from each other to provide a gap therebetween, said magnets being poled perpendicular to the gap with like poles facing one another.

2. The bearing structure of claim 1 wherein said first and second rings each comprise a plurality of respectively substantially identical segments.

3. The bearing structure of claim 2 wherein said segments have edges that are skewed with respect to the axial direction of said bearing structure.

4. The bearing structure of claim 1 wherein said segments are formed of parallel laminations of thin segment shaped elements of a permanent magnetic material.

5. The bearing structure of claim 2 wherein each segment is formed of a radial stack of segment portions, each portion comprising a permanent magnetic material.

6. The bearing structure of claim 1 wherein said permanent magnetic material is samarium cobalt.

7. The bearing structure of claim 1 further comprising a member consisting of a soft magnetic material disposed on the surface of one of said permanent magnet rings facing said gap, whereby detenting action of said bearing is reduced.

8. The bearing structure of claim 7, comprising two said members, each being a thin iron sleeve, disposed respectively on the outer and inner surfaces of said first and second permanent magnet rings.

9. The bearing structure of claim 1 wherein said first and second permanent magnetic rings extend solely in the axial direction of said bearing structure, whereby said gap also extends solely in said axial direction.

10. The bearing structure of claim 9 wherein one of the permanent magnet rings is longer than the other, whereby axial movement between said inner and outer rings does not affect radial restoring forces of said bearing structure.

11. A bearing structure comprising:
    a cup-shaped inner ring having outwardly extending flanges and formed of magnetic material;
    a cup-shaped outer ring having inwardly extending flanges, and formed of magnetic material;
    a first permanent magnet ring disposed on the outer surface of said inner ring between the respective inner ring flanges; and
    a second permanent magnet ring disposed on the inner surface of said outer ring between the respective outer ring flanges and spaced from said first magnet ring to provide a gap therebetween, said magnets being poled perpendicularly to the gap with like poles facing one another,
    said inner and outer rings being arranged to provide structural restraint and flux return paths for the respective permanent magnet rings.

12. The bearing structure of claim 11 or claim 1, further comprising dynamic compensation means for compensating for instability of said bearing structure, said compensation means comprising:
    a portion extending from each of said inner and outer cup-shaped rings of magnetic material, at least one of said extending portions comprising electromagnet means arranged to magnetically influence said gap,
    sensor means connected to said outer ring and positioned to have an output corresponding to the relative position of said inner and outer rings, and
    electrical control means connected to be controlled by said sensor means and energizing said electromagnet means,
    whereby said compensation means requires less power than that required by an active magnetic bearing.

13. The bearing structure of claim 11 wherein said gap extends in a generally axial direction; said first and second permanent magnet rings each comprise a pair of rings that have greater diameters at one end than the other, and substantially constant radial thickness, the rings of each pair having diameters that increase toward opposite axial ends of said bearing structure; and said inner and outer cup-shaped rings have greater outer and inner diameters respectively at opposite axial ends than adjacent the center of said bearing structure, and have respective outwardly and inwardly extending annular ridges disposed between the rings of the respective pair of permanent magnet rings.

14. The bearing structure of claim 12 wherein said sensor means senses the width of said gap at a predetermined position; and said electromagnet means comprises at least one electromagnet mounted in said outer ring and having pole faces directed to and spaced apart from said inner ring, whereby said electromagnet magnetically influences said inner ring to control the width of said gap.

15. The bearing structure of claim 12 wherein said dynamic compensation is axial.

* * * * *